United States Patent [19]

Komatsuda et al.

[11] Patent Number: 5,555,560
[45] Date of Patent: Sep. 10, 1996

[54] REQUEST CANCEL SYSTEM FOR CANCELLING A SECOND ACCESS REQUEST HAVING THE SAME ADDRESS AS A FIRST ACCESS REQUEST

[75] Inventors: Hiroshi Komatsuda, Yokohama; Hidehiko Nishida, Inagi, both of Japan

[73] Assignee: Fujitsu Limited, Kawasaki, Japan

[21] Appl. No.: 452,576

[22] Filed: May 25, 1995

Related U.S. Application Data

[63] Continuation of Ser. No. 101,095, Aug. 3, 1993, abandoned, which is a continuation of Ser. No. 466,638, Jan. 17, 1990, abandoned.

[30] Foreign Application Priority Data

Jan. 17, 1989 [JP] Japan ............................ 1-8064

[51] Int. Cl.$^6$ ............................. G06F 12/06; G06F 13/14
[52] U.S. Cl. ............................ 395/405; 395/479; 395/485; 395/494; 395/496; 364/254.3; 364/259.2; 364/264.6; 364/271.6; 364/942.04; 364/947.2; 364/950.2; 364/957.1; 364/DIG. 1; 364/DIG. 2
[58] Field of Search ..................... 395/477, 478, 395/479, 485, 496, 405, 494, 859, 860

[56] References Cited

U.S. PATENT DOCUMENTS

| | | | |
|---|---|---|---|
| 4,598,362 | 7/1986 | Kinjo et al. .............................. | 395/250 |
| 4,680,730 | 7/1987 | Omoda et al. ........................... | 395/496 |
| 4,745,545 | 5/1988 | Schiffleger ............................... | 395/477 |
| 4,755,938 | 7/1988 | Takahashi et al. ...................... | 395/729 |
| 4,800,535 | 1/1989 | McAlpine ............................... | 371/51.1 |
| 4,802,125 | 1/1989 | Yamada ................................... | 365/238 |
| 4,866,603 | 9/1989 | Chiba ....................................... | 395/484 |
| 4,870,569 | 9/1989 | Nakatani et al. ........................ | 395/478 |
| 4,914,575 | 4/1990 | Kihara et al. ............................ | 395/484 |
| 5,045,993 | 9/1991 | Murakami et al. ...................... | 395/476 |
| 5,060,145 | 10/1991 | Scheuneman et al. ................ | 365/230.03 |
| 5,214,769 | 5/1993 | Uchida et al. .......................... | 395/478 |

FOREIGN PATENT DOCUMENTS

| | | |
|---|---|---|
| 0187518A2 | 12/1985 | European Pat. Off. . |
| 60-120449 | 6/1985 | Japan . |
| 63-109566 | 5/1988 | Japan . |
| 63-236153 | 10/1988 | Japan . |

*Primary Examiner*—Glenn Gossage
*Attorney, Agent, or Firm*—Staas & Halsey

[57] ABSTRACT

A request cancel system is incorporated in a processing system which includes a main storage unit having a plurality of banks, a memory control unit and a plurality of access units, such as central processing units (CPUs), which access the banks of the main storage unit via the memory control unit. A check part in the request cancel system detects whether or not a bank designated by an address of an access request from one of the access units is in use by reading a corresponding bank busy flag from a bank busy flag group. After the check part has determined that a bank designated by an address of a first access request is not busy, a flag is sent to the bank busy flag group to indicate that the bank accessed by the first access request is busy. A second access request to the bank accessed by the first access request can be processed by the check part before the flag is set in the bank busy flag group. A comparator compares the addresses of the first access and second access requests and outputs a coincidence signal when the addresses of the first and second access requests coincide. A request cancel controller cancels the second access request in response to the coincidence signal from the comparator.

9 Claims, 5 Drawing Sheets

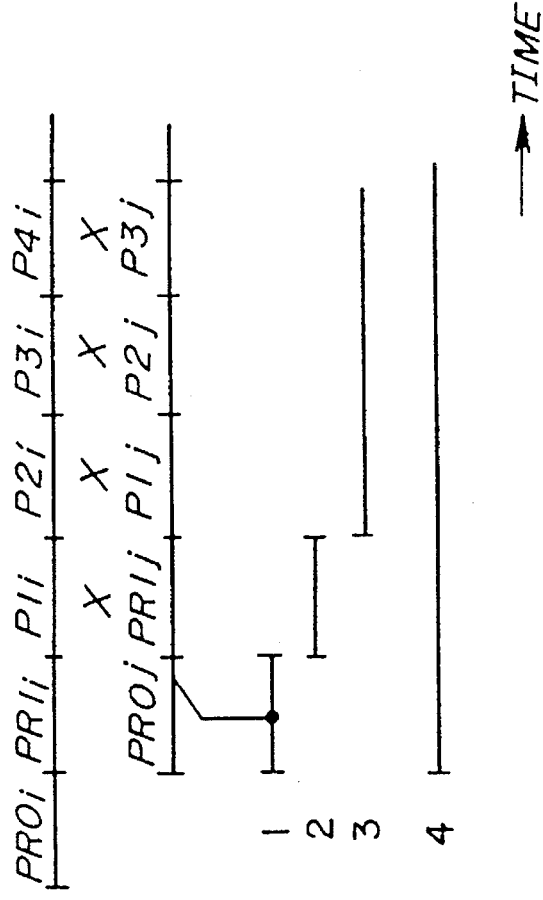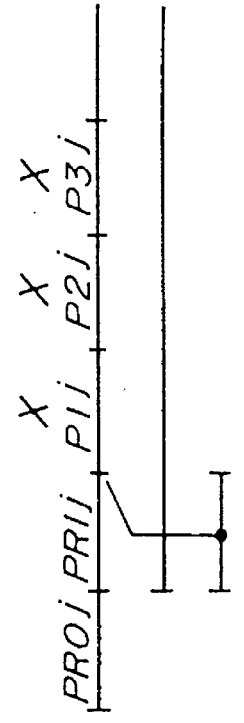
FIG. 3(A) PRIOR ART
FIG. 3(B) PRIOR ART
FIG. 3(C) PRIOR ART
FIG. 3(D) PRIOR ART
FIG. 3(E) PRIOR ART
FIG. 3(F) PRIOR ART
FIG. 5(A)
FIG. 5(B)
FIG. 5(C)
FIG. 5(D)

→ TIME

REQUEST CANCEL SYSTEM FOR CANCELLING A SECOND ACCESS REQUEST HAVING THE SAME ADDRESS AS A FIRST ACCESS REQUEST

This application is a continuation of application Ser. No. 08/101,095, filed Aug. 3, 1993, now abandoned, which is a continuation of application Ser. No. 07/466,638, filed Jan. 17, 1990, also now abandoned.

BACKGROUND OF THE INVENTION

The present invention generally relates to request cancel systems, and more particularly to a request cancel system for cancelling a request to a memory device.

FIG. 1 generally shows a processing system in which a plurality of central processing units (CPUs) $101_1$ through $101_n$ can access the banks of a main storage unit (MSU) 103 via a memory control unit (MCU) 102. The CPUs $101_1$ through $101_n$ are used as access units.

Conventionally, when accessing to a bank of the MSU 103, which is used in common by the CPUs $101_1$ through $101_n$, the MCU 102 (having a system structure shown in FIG. 2) controls access requests so that a first access requested by one CPU $101_i$ and a following second access requested by another CPU $101_j$ do not access the same bank of the MSU 103.

In FIG. 2, it is assumed for the sake of convenience that the first access is requested by the CPU $101_i$ and the following second access is requested by the CPU $101_j$. A bank busy flag group 21 stores information which indicates whether or not banks of the MSU 103 are in use (that is, "busy") in correspondence with the addresses of the banks. In a first cycle, when the first access request is received by the MCU 102, an address of the first access request is stored in an interface register 22-1 and a request operation code, a request effective signal and other contents of the first access request are stored in an interface register 23-1. Predetermined lower bits of the address which is stored in the interface register 22-1 are decoded by a decoder 24-1 and a decoded address is supplied to a selector 25. This decoded address designates a bank of the MSU 103. The selector 25 outputs a busy flag corresponding to the bank which is designated by the decoded address. This busy flag is supplied to a checking part 26-1 which also receives the predetermined lower bits of the address from the interface register 22-1. The busy flag indicates whether or not the designated bank is busy.

In this case, it is assumed for the sake of convenience that the designated bank is not busy and the check part 26-1 supplies to an AND circuit $27_1$ a signal which indicates that the address of the first access request does not match the address of a bank which is busy. An output signal of the AND circuit $27_1$ is supplied to a priority controller 28 which controls a selector 29. The priority controller 28 discriminates whether or not to permit the selector 29 to selectively output the request operation code, the request effective signal and other contents of the first access request which are stored in the interface register 23-1, based on the signal from the AND circuit $27_1$.

The selector 29 selectively outputs the request operation code from the interface register 23-1 in response to a control signal from the priority controller 28. Hence, the request operation code of the first access request is stored in a PR1 register 30. In addition, the priority controller 28 sets an address selection signal in a PR1' register 31. The output of the PR1 register 30 is supplied to a MSU interface register 39.

Then, in a second cycle, the request operation code of the first access request which is stored in the PR1 register 30 is set in a P1 register 32-1, and the address selection signal which is stored in the PR1' register 31 is supplied to control a selector 33. The P1 register 32-1, a P2 register 32-2 and the like constitute a pipeline PL. The selector 33 selectively outputs the predetermined lower bits of the address which is stored in the interface register 22-1. The predetermined lower bits output from the selector 33 are set in a P1' register 34. In addition, the predetermined lower bits output from the selector 33 are supplied to a decoder 36. The decoder 36 decodes the predetermined lower bits of the address and sets the bank busy signal to the ON state only during this cycle. This bank busy signal prevents the same bank from being selected by the priority controller 28 when the second access request designates the same bank as the first access request. At the same time, an address and a request operation code of the second access request by the CPU $101_j$ are respectively stored in interface registers 22-2 and 23-2. It is assumed that the address of the second access request is identical to the address of the first access request.

In a third cycle, the request operation code of the first access request which is stored in the P1 register 32-1 is set in the P2 register 32-2, and the predetermined lower bits of the address which are stored in the P1' register 34 are supplied to a decoder 35. The decoder 35 decodes the predetermined lower bits of the address of the first access request and sets the bank busy signal to the ON state only during this cycle. This bank busy signal is supplied to an OR circuit 37 and the bank busy flag set to indicate the busy state. Output signals of the decoders 35 and 36 are supplied to the OR circuit 37, and an output signal of the OR circuit 37 is supplied to an OR circuit 38 which is also supplied with the bank busy flag. Actually, the OR circuit 37 comprises a number of OR gates equal to the number of banks, and the OR circuit 38 also comprises a number of OR gates equal to the number of banks.

At this point in time, it is finally detected from an output signal of the OR circuit 38 that the bank which is designated by the address of the second access request is busy. Hence, the check part 26-2 supplies to the AND circuit $27_2$ a signal which indicates that the address of the second access request matches the address of the bank which is busy, and the priority controller 28 prohibits the CPU $101_j$ from accessing the bank which is busy in response to the output signal of the AND circuit $27_2$.

In a fourth cycle and thereafter, the contents of the second access request are not set in the register PR1 30 by the operation of the priority controller 28 based on the busy flag signal which is registered in the bank busy flag group 21.

Although not shown in FIG. 2, the address is supplied to the MSU 103 when the priority controller 28 selects the interface register 22-1 (or 22-2) and sets the address from the selected interface register in the MSU interface register 39.

FIGS. 3(A) through 3(F) are timing charts for explaining the general operation timing of the MCU 102. In FIG. 3(A), cycles PR0$i$, PR1$i$, P1$i$ and P2$i$ respectively correspond to the first, second, third and fourth cycles described above for the CPU $101_i$. Similarly, cycles PR0$j$, PR1$j$ and P1$j$ shown in FIG. 3(B) respectively correspond to the second, third and fourth cycles described above for the CPU $101_j$. FIGS. 3(C) through 3(F) respectively show the timings of signals at parts ① through ④ of the MCU 102 shown in FIG. 2. It can be seen from FIG. 3(B) that the second access request is not accepted, that is, cancelled, from the cycle PR1j as indicated by "X" above the cycles. FIG. 3(E) shows a time when the set bank busy flag is output to indicate the busy state of the bank.

Accordingly, when the consecutive first and second access requests access identical banks, it is detected, when the second access request is received, that the designated bank is busy. This detection is made in a path PA indicated by a phantom line in FIG. 2. However, the second access request is only cancelled from the cycle PR1j (third cycle). For this reason, as the scale of the MSU 103 becomes large and/or the number n of CPUs $101_1$ through $101_n$ becomes large, the number of selectors 33, logic circuits such as decoders 35 and 36 and gates in the path PA becomes considerably large. As a result, there is a problem in that the delay time introduced in the path PA becomes large and the time required to detect a bank busy state may exceed one machine cycle of the MCU 102.

SUMMARY OF THE INVENTION

Accordingly, it is a general object of the present invention to provide a novel and useful request cancel system in which the problems described above are eliminated.

Another and more specific object of the present invention is to provide a request cancel system adapted to a processing system which has a main storage unit having a plurality of banks. A memory control unit and a plurality of access units access the banks of the main storage unit via the memory control unit. The request cancel system comprises bank busy flag group means for storing bank busy flags in correspondence with each of the banks of the main storage unit. Each of the bank busy flags are set when a corresponding one of the banks is in use. A register means stores addresses and contents of access requests from the access units. Check means detects whether or not a bank designated by an address of an access request from one of the access units is in use by reading a corresponding bank busy flag from the bank busy flag group means. A comparator means compares an address of a first access request and an address of a second access request which is processed immediately after the first access request and outputs a coincidence signal when the addresses of the first and second access requests coincide. The check means will not receive a bank busy signal due to the first access request by the time the second access request is checked, so a request cancel control means cancel the second access request in response to the coincidence signal from the comparator to prevent processing of the second access request. According to the request cancel system of the present invention, even when the first and second access requests designate the same bank and the bank is detected as not being busy during a cycle, the request content of the second access request is cancelled during a next cycle when the same bank is designated. For this reason, the time required to detect a bank busy state falls within one machine cycle of the memory control unit, and an accurate and high-speed access to the main storage unit is ensured.

Other objects and further features of the present invention will be apparent from the following detailed description when read in conjunction with the accompanying drawings.

BRIEF DESCRIPTION OF THE DRAWINGS

FIGS. 3(A) through 3(F) are timing charts for explaining a general operation timing of the memory control unit shown in FIG. 2;

FIGS. 5(A) through 5(D) are timing charts for explaining a general operation timing of the memory control unit of the present invention shown in FIG. 4.

DESCRIPTION OF THE PREFERRED EMBODIMENTS

Figure 1:
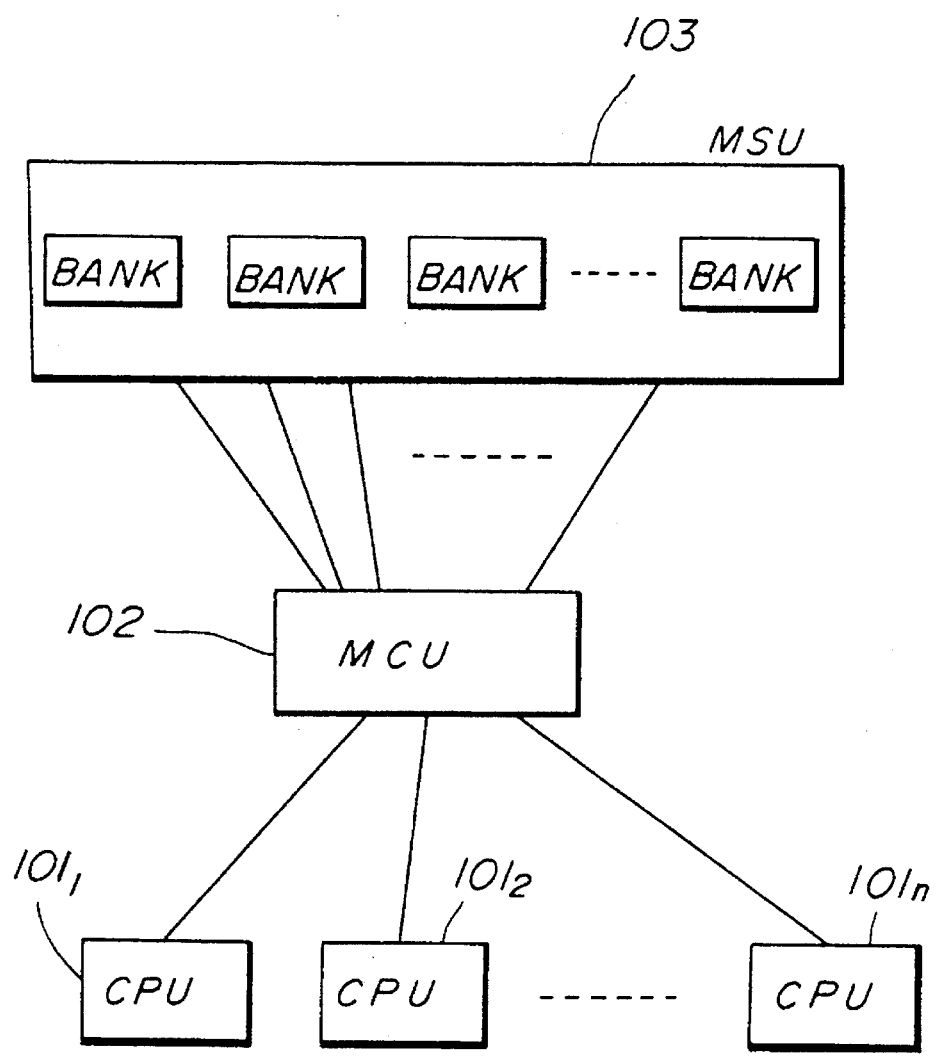
FIG. 1 is a system block diagram generally showing a conventional processing system to which a request cancel system is applied.
Figure 2:
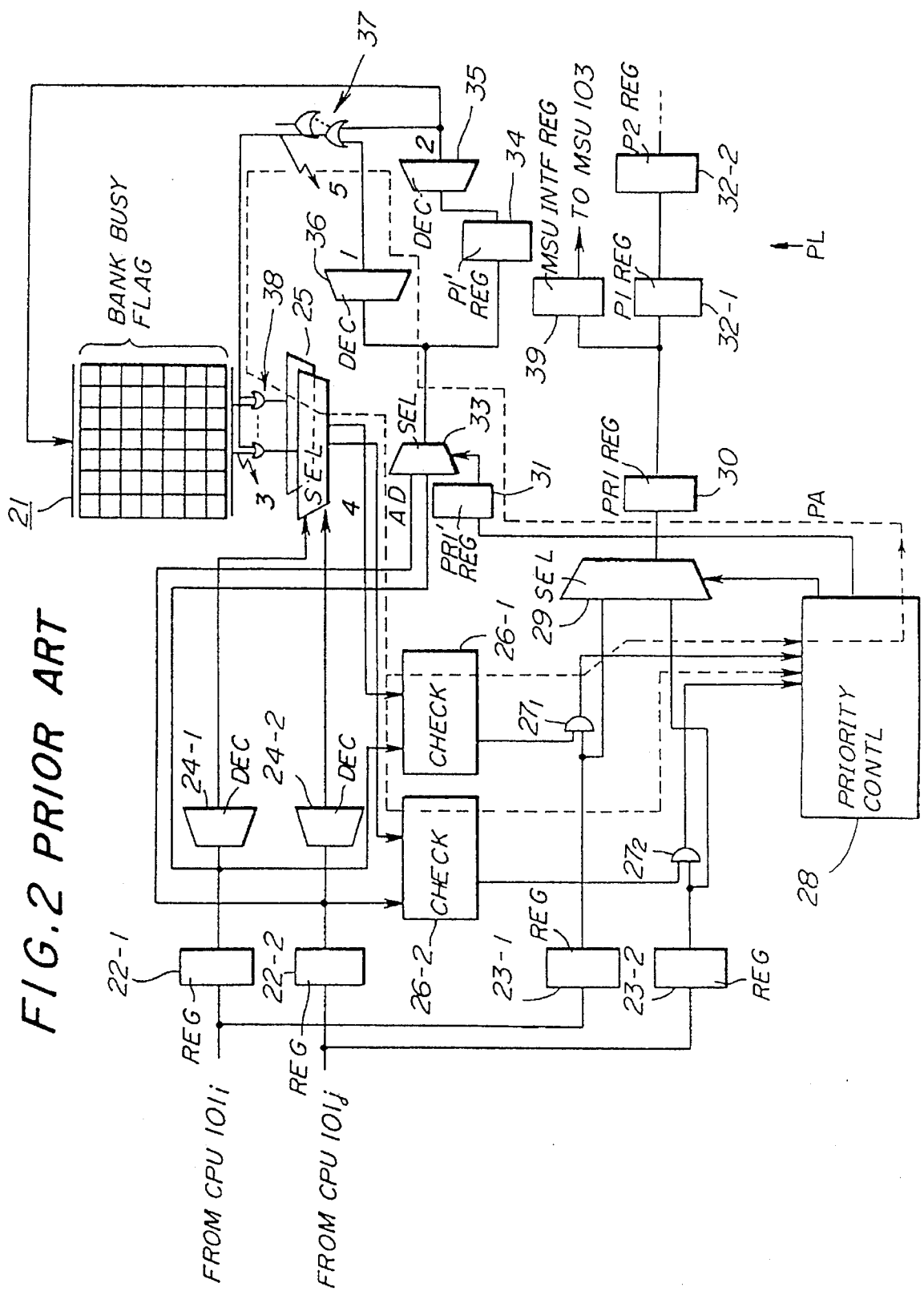
FIG. 2 is a system block diagram showing an essential part of a conventional memory control unit as shown in FIG. 1.
Figure 4:
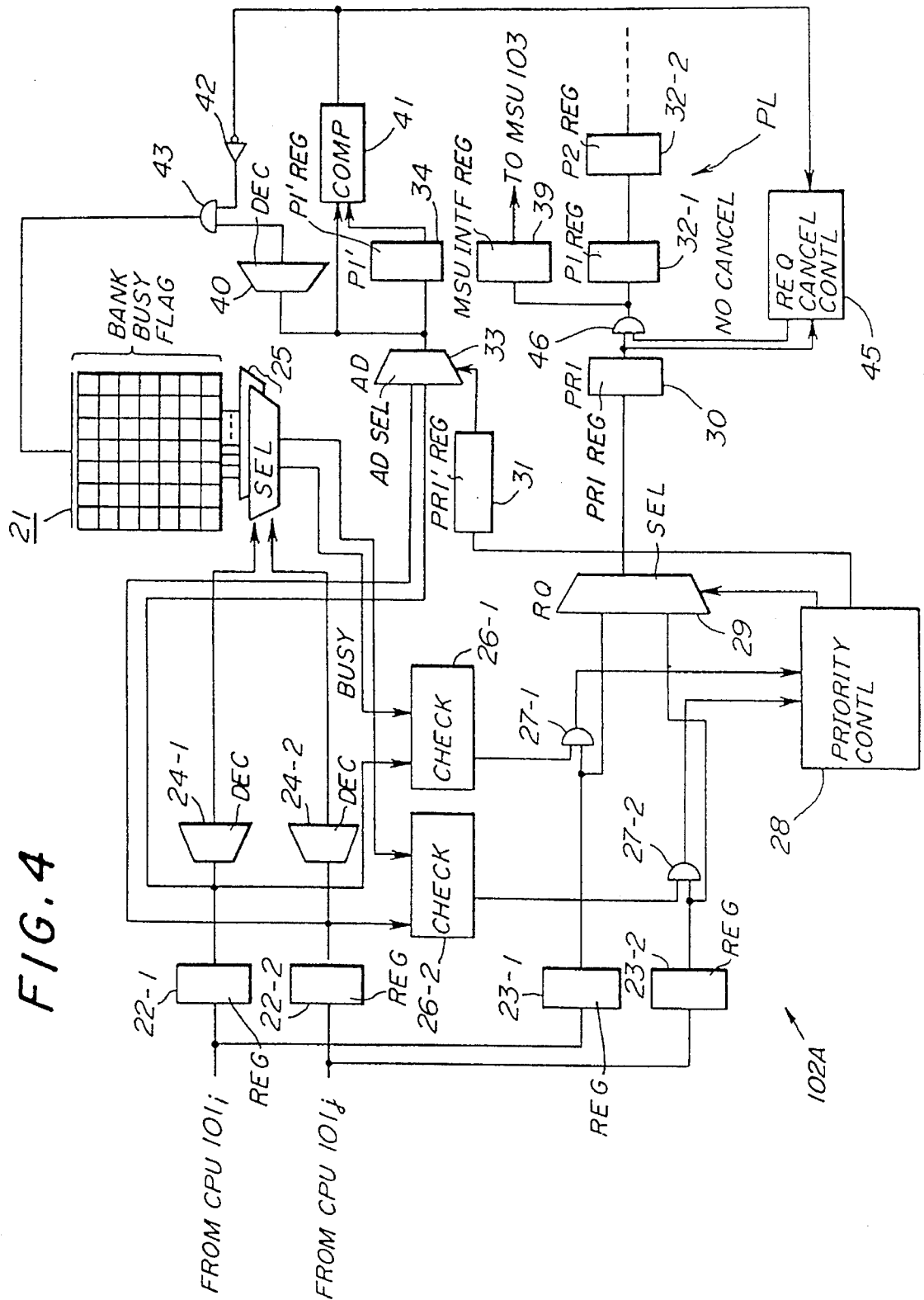
FIG. 4 is a system block diagram showing an embodiment of a request cancel system of the memory control unit according to the present invention.

FIG. 4 shows an essential part of an embodiment of a request cancel system of a memory control unit (MCU) according to the present invention. A MCU 102A shown in FIG. 4 is used in a processing system shown in FIG. 1 in place of the MCU 102. In FIG. 4, those parts which are essentially the same as those corresponding parts in FIG. 2 are designated by the same reference numerals, and a detailed description thereof will be omitted.

First, a brief description will be given of the operating principle of this embodiment. Because a bank busy flag read out from the bank busy flag group 21 may indicate that a bank designated by a first access request and a following second access request is not busy when the second access request is processed by the check part 26-2, a comparator 41 compares predetermined lower bits of the addresses of first and second access requests. This comparison determines whether the bank designated by the second access request matches the bank designated by the first access request. A request cancel controller 45 cancels the content of the second access request when the comparator 41 determines that the bank designated by the second access request matches the bank designated by the first access request. As a result, the content of the second access request is prevented from being supplied to the pipeline PL and the MSU 103.

Accordingly, even when the same bank is designated by the first and second access requests and the bank busy flag read out from the bank busy flag group 21 during a cycle PR0j in FIG. 5(B) indicates that the bank is not busy, the content of the second access request is cancelled when it is detected during the next cycle PR1j that the same bank is designated by the first and second access requests. It is thus possible to ensure that the time required to detect a bank busy state is within one machine cycle of the MCU 102.

Next, a more detailed description will be given of this embodiment.

First, a description will be given of a cycle PR0i of the CPU $101_i$ as shown in FIG. 5(A). It is assumed for the sake of convenience that the first access is requested by the CPU $101_i$ and the following second access is requested by the CPU $101_j$, and that the same bank is designated by the first and second access requests. In the cycle PR0i, when the first access request is received by the MCU 102, an address of the first access request is stored in the interface register 22-1 and a request operation code, a request effective signal and other contents of the first access request are stored in the interface register 23-1. Predetermined lower N bits of the address which is stored in the interface register 22-1 are decoded by the decoder 24-1 and a decoded address is supplied to the selector 25. This decoded address designates a bank of the MSU 103. The selector 25 outputs a busy flag corresponding to the bank which is designated by the decoded address, and this busy flag is supplied to the checking part 26-1 which also receives the predetermined lower bits of the address which are stored in the interface register 22-1. The busy flag indicates whether or not the designated bank is busy.

In this case, it is assumed for the sake of convenience that the designated bank is not busy and the check part 26-1 supplies to the AND circuit 27-1 a signal which indicates that the address of the first access request does not match the address of a bank which is busy. An output signal of the AND circuit 27-1 is supplied to the priority controller 28 which controls the selector 29. The priority controller 28 discriminates whether or not to permit the selector 29 to selectively output the request operation code, the request effective signal and other contents of the first access request which are stored in the interface register 23-1, based on the signal from the AND circuit 27-1.

In the cycle PR0$i$ of the CPU 101$_i$ shown in FIG. 5(A), the selector 29 selectively outputs the request operation code, the request effective signal and other contents of the first access request from the interface register 23-1 in response to a control signal from the priority controller 28. Hence, the request operation code of the first access request is stored in the PR1 register 30. In addition, the priority controller 28 sets an address selection signal in the PR1' register 31. The output of the PR1 register 30 is supplied to the MSU interface register 39.

Then, in a cycle PR1$i$ of the CPU 101$_i$ shown in FIG. 5(A), the request operation code of the first access request which is stored in the PR1 register 30 is set in the P1 register 32-1 and the address selection signal which is stored in the PR1' register 31 is supplied to the selector 33 to set the lower N bits of the address of the selected first access request in the P1' register 34. The selector 33 selectively outputs the predetermined lower N bits of the address which is stored in the interface register 22-1. The predetermined lower N bits output from the selector 33 are set in the P1' register 34. At the same time, the cycle PR1$i$ corresponds to a cycle PR0$j$ of the CPU 101$j$ shown in FIG. 5(B), and an address and a request operation code, a request effective signal and other contents of the second access request by the CPU 101$_j$ are respectively stored in the interface registers 22-2 and 23-2. However, at this point in time, the bank busy flag which corresponds to the address of the first access request is not yet set in the bank busy flag group 21 to indicate that the bank which is designated by the address of the second access request is busy. For this reason, similarly as in the case of the first access request described above, the check part 26-2 supplies to the AND circuit 27-2 a signal which indicates that the address of the second access request does not match the address of the bank which is busy. An output signal of the AND circuit 27-2 is supplied to the priority controller 28. The selector 29 receives the request operation code, the request effective signal and other contents of the second access request which are stored in the interface register 23-2 and selectively outputs the request operation code in response to the control signal from the priority controller 28. Hence, the request operation code of the second access request is stored in the PR1 register 30. In addition, the priority controller 28 sets an address selection signal in the PR1' register 31.

In a cycle P1$i$, in response to the setting of the content of the first access request in the P1 register 32-1 and the setting of the lower N bits of the first access request in the P1' register 34 during the cycle P1$i$, the request operation code of the first access request which is stored in the P1 register 32-1 is set in the P2 register 32-2. The lower N bits of the first access request stored in the P1' register 34 are supplied to the comparator 41 and the lower N bits of the second access request are selectively supplied from the selector 33 to the comparator 41 responsive to the address selection signal which is read out from the PR1' register 31. In this case, the first and second access requests designate the same bank. For this reason, the comparator 41 outputs a coincidence signal which indicates that the designated banks are the same, and this coincidence signal is supplied to an inverter 42 and a request cancel controller 45.

When the request cancel controller 45 receives the coincidence signal, the request cancel controller 45 supplies a low-level cancel instruction signal to an AND circuit 46 so as to cancel the content of the second access request. In other words, the content of the second access request stored in the PR1 register 30 is blocked by the AND circuit 46 and is prevented from being set in the P1 register 32-1. On the other hand, the inverter 42 inverts the coincidence signal into a non-coincidence signal and sets a bank busy flag in the bank busy flag group 21 with respect to the corresponding bank via an AND circuit 43. Thus, the selector 25 outputs the set busy flag which indicates that the bank is busy. Therefore, the access to the bank which is busy cannot be made in the cycle P1$j$ and thereafter.

A cycle P2$i$ corresponds to a cycle P1$j$ of the CPU 101$_j$ shown in FIG.5(B). As indicated by "X" in FIG. 5(B), the second access request is cancelled starting from the cycle P1$j$.

FIGS. 5(A) through 5(D) are timing charts for explaining the general operation timing of the MCU 102A shown in FIG.4 when the same bank is designated by the first and second access requests. During the cycle P1$i$ of the CPU 101$_i$ shown in FIG. 5(A) (the cycle PR1$j$ of the CPU 101$_j$ shown in FIG. 5(B)), the comparator 41 compares the lower N bits of the address of the first access request which is made by the CPU 101$_i$ and the lower N bits of the address of the second access request which is made by the CPU 101$_j$. When the two compared addresses coincide, the request cancel controller 45 cancels the setting of the content of the second access request in the P1 register 32-1 as indicated by "X" in FIG. 5(B). FIG. 5(C) shows a time when the set bank busy flag is output to indicate the busy state of the bank, and FIG. 5(D) shows a time when the cancel instruction signal is output from the request cancel controller 45.

Figure 6A:
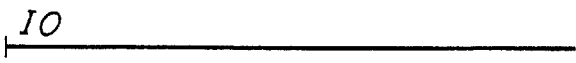
FIGS. 6(A) through 6(N) are timing charts for explaining the operation of the memory control unit of the present invention shown in FIG. 4.
Figure 6B:
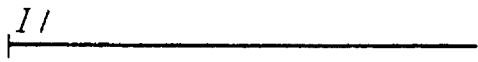
Figure 6C:
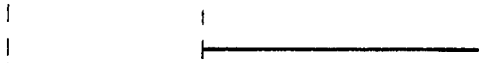
Figure 6D:
Figure 6E:

Next, a description will be given of the operation of the MCU 102A, by referring to FIGS. 6(A) through 6(N). FIG. 6(A) shows the timing with which the request contents including the address and the request operation code of the first access request are set in the interface registers 22-1 and 23-1 from the CPU 101$_i$. FIG. 6(B) shows the timing with which the request contents including the address and the request operation code of the second access request are set in the interface registers 22-2 and 23-2 from the CPU 101$_j$. This timing shown in FIG. 6(B) lags the timing shown in FIG. 6(A) by one cycle.

It is assumed that the bank designated by the first access request is not busy, as described before. However, the bank designated by the second access request is busy from the cycle P1$i$ as shown in FIG. 6(C). FIG. 6(D) shows the timing with which the check part 26-1 detects the non-busy state of the bank, and FIG. 6(E) shows a timing with which the check part 26-2 detects the non-busy state of the bank. As shown in FIG. 6(E), the check part 26-2 detects the non-busy state of the bank only during the cycles PR0$i$ and PR1$i$.

Figure 6F:
Figure 6G:
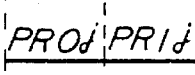

In FIG. 6(F), PR1$i$, P1$i$ and P2$i$ respectively show timings with which the content of the first access request is successively transferred to the PR1 register 30, the P1 register 32-1 and the P2 register 32-2. Similarly, in FIG. 6(G), PR1$j$ shows a timing with which the content of the second access request is transferred to the PR1 register 30. It can be seen from FIG. 6(G) that the content of the second access request is cancelled and is not transferred beyond the PR1 register 30.

Figure 6H:
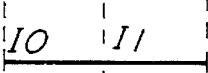
Figure 6I:
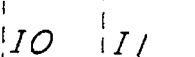
Figure 6J:
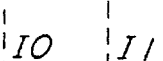

In FIG. 6(H), I0 and I1 respectively show timings with which the addresses of the first and second access requests are selected by the address selection signal from the PR1' register 31. In FIG. 6(I), I0 and I1 respectively show timings with which the addresses from the interface registers 22-1 and 22-2 are selectively output from the selector 33. In FIG. 6(J), I0 and I1 respectively show timings with which the addresses of the first and second access requests are set in the P1' register 34.

Figure 6K:
Figure 6L:

FIG. 6(K) shows the timing with which the comparator 41 outputs the coincidence signal. FIG. 6(L) shows the timing with which the request cancel controller 45 outputs the cancel instruction signal. During this timing shown in FIG. 6(L), the request cancel controller 45 cancels the setting of the request content of the second access request to the P1 register 32-1 in response to the coincidence signal which is received from the comparator 41 with the timing shown in FIG. 6(K).

Figure 6M:
Figure 6N:

FIG. 6(M) shows the timing with which only the request content of the first access request is set from the PR1 register 30 to the MSU interface register 39 to be transmitted to the MSU 103. FIG. 6(N) shows a timing with which the bank busy flag which corresponds to the bank which is designated by the first access request is set in the bank busy flag group 21.

Further, the present invention is not limited to these embodiments, but various variations and modifications may be made without departing from the scope of the present invention.

What is claimed is:

1. A request cancel system for a data processing system, the data processing system including a main storage unit having a plurality of banks for controlling access from a plurality of access units, said request cancel system comprising:

bank busy flag group means for storing bank busy flags for each of the banks of the main storage unit, each of said bank busy flags being set when a corresponding one of the banks is in use;

register means for storing addresses and contents of access requests from the access units;

check means for detecting whether a bank designated by an address of an access request is in use based on a corresponding bank busy flag from said bank busy flag group means and for outputting a check signal;

selector means for selectively outputting a first access request to the main storage unit in response to the check signal indicating that the bank designated by the address of the first access request is not in use and for selectively outputting a second access request to the main storage unit, after selectively outputting the first access request, in response to the check signal for the second access request indicating that the bank designated by the address of the second access request is not yet busy;

comparator means, separate from said check means, for comparing the address of the first access request and the address of the second access request and for outputting a coincidence signal if the addresses of the first and second access requests coincide; and request cancel control means for cancelling the second access request output from said selector means in response to the coincidence signal from said comparator means.

2. The request cancel system as claimed in claim 1, wherein said bank busy flag group means, said register means, said check means, said selector means, said comparator means and said request cancel control means are included in a memory control unit of the data processing system, said memory control unit being coupled between the access units and the main storage unit.

3. The request cancel system as claimed in claim 1, wherein said check means detects whether the bank designated by the address of the second access request is busy during a first cycle, said comparator means outputs the coincidence signal, when the addresses of the first and second access requests coincide, during a second cycle which occurs immediately after the first cycle, and said request cancel control means cancels the second access request during the second cycle.

4. The request cancel system as claimed in claim 1, wherein said request cancel control means cancels the second access request output from said selector means by prohibiting a content of the second access request from being output from said selector means to the main storage unit.

5. The request cancel system as claimed in claim 4, wherein said request cancel control means cancels the second access request during a cycle in which a content of the first access request is output from said selector means to the main storage unit.

6. The request cancel system as claimed in claim 1, wherein the data processing system further includes a pipeline coupled to said register means, and wherein said request cancel control means cancels the second access request output from said selector means by prohibiting a content of the second access request from being output from said selector means to the main storage unit and said pipeline.

7. The request cancel system as claimed in claim 6, wherein said request cancel control means cancels the second access request during a cycle in which a content of the first access request is output from said selector means to the main storage unit and said pipeline.

8. The request cancel system as claimed in claim 1, further comprising setting means for setting the corresponding bank busy flag in said bank busy flag group means for the bank designated by the address of the second access request in response to the coincidence signal received from said comparator means.

9. The request cancel system as claimed in claim 8, wherein the data processing system includes a pipeline coupled to said register means, and wherein said setting means begins to set the corresponding bank busy flag in said bank busy flag group means for the first access request during a cycle in which the first access request is output from said selector means.

* * * * *